United States Patent [19]

McEowen

[11] 3,916,116

[45] Oct. 28, 1975

[54] HOLD BRIDGE CIRCUIT

[75] Inventor: James Royce McEowen, Holmdel Township, Monmouth County, N.J.

[73] Assignee: Bell Telephone Laboratories, Incorporated, Murray Hill, N.J.

[22] Filed: Dec. 12, 1973

[21] Appl. No.: 426,648

[52] U.S. Cl. ............................ 179/99; 179/18 FA

[51] Int. Cl.$^2$ ............................ H04M 1/00

[58] Field of Search ....... 179/99, 81 R, 18 F, 18 FA

[56] References Cited

UNITED STATES PATENTS

| | | | |
|---|---|---|---|
| 2,862,062 | 11/1958 | Carter | 179/99 |
| 3,283,083 | 11/1966 | MacLeod | 179/99 |
| 3,598,924 | 8/1971 | Zucker | 179/99 |
| 3,703,611 | 11/1972 | Kiyomiya | 179/99 |
| 3,725,600 | 4/1973 | Hutton | 179/99 |
| 3,733,442 | 5/1973 | Lee | 179/99 |
| 3,764,752 | 10/1973 | Yachabach | 179/99 |

*Primary Examiner*—Kathleen H. Claffy
*Assistant Examiner*—Gerald L. Brigance
*Attorney, Agent, or Firm*—David H. Tannenbaum

[57] ABSTRACT

Multiple telephone line service is provided to a subscriber station served directly from a telephone central office by an extremely simplified circuit arrangement which reduces to a minimum the number of components necessary to provide the hold function on any line. A single relay, powered solely from line current, is used per line to achieve hold, which relay is operable from a single contact of a hold key common to all lines. The circuit arrangement provides for positive control of the hold relay both for releasing and for operating. Temporary operation of the hold relay is also provided to achieve a privacy feature.

9 Claims, 3 Drawing Figures

HOLD BRIDGE CIRCUIT

FIELD OF THE INVENTION

This invention relates to telephone systems and, more particularly, to an arrangement for providing multiline service to a subscriber served directly from a central switching system.

BACKGROUND OF THE INVENTION

The problem to be overcome is the design of a small telephone station system for use in small business or home environments where each station set has access to more than one line. Traditionally, such systems are called key telephone systems and are used primarily in commercial environments where line circuits, such as the line circuit shown in U.S. Pat. No. 3,436,488 issued to R. E. Barbato and D. T. Davis on Apr. 1, 1969, are connected between the station and the switching network for the purpose of controlling the connection. Such line circuits require complex logic circuitry and operate from power supplied at the customer premises (local power). At least one of these circuits plus a power source is required for each line serving the system and, thus, the cost to the subscriber becomes an important factor in determining whether or not to install a system where each telephone station is capable of answering a number of lines. The clear alternative in such a situation is the use of multiple telephone sets, one for each line.

Although the problem is simply stated, the solution which results in a viable system was not easy to achieve. First, the various problems inherent in providing a very small telephone system must be perceived and analyzed. This was done and it was found that to be successful the system must be designed to fit entirely within a subscriber station. This results from the fact that the small business or home environment does not have the space to mount central equipment and, even if space were available, it is usually difficult at best to run the large number of wires which are typically necessary with the line card controlled key telephone systems. The system must also be easy to operate and self-explanatory since training of attendants is not feasible in the environment in which such a system is to be used. Also, since the system is to operate from a central power source care must be taken to have the system operate within all permissible line loop lengths without requiring range extension equipment.

After lengthy analysis, it was determined that three essential elements must be provided if a single telephone station is to have access to a number of lines, i.e.,: (1) visual displays so that the subscriber knows at all times which line or lines are active; (2) a hold bridge operable to maintain any line active so that the subscriber, busy on one line, may place or receive a call on another line; and (3) a key arrangement for allowing a subscriber to choose which line will be connected to and to allow the subscriber to enable the hold function with respect to a given line.

The hold bridge requirement causes problems if it is to be achieved in a manner to allow mounting within a telephone station set and if the hold bridge is to operate from current supplied from the line. Of particular importance and complexity is the requirement that the hold function be capable of activation from any station connected to the line. Also, for the reasons discussed above, a minimum number of wires must be utilized to achieve these results, all without central control.

Accordingly, it is an object of my invention to provide a simplified hold bridge operable from a number of stations for enabling the hold function with respect to any line of a multiline telephone system.

It is a further object of my invention to provide such an arrangement for a multistation system in a manner to control positively the operation as well as the release of the hold bridge so as to avoid complex logic circuitry to insure the proper release of the bridge from any station.

SUMMARY OF THE INVENTION

In my copending application (J. R. McEowen 9), Ser. No. 426643, filed concurrently herewith, I have disclosed an extremely simplified visual status indicator circuit which meets all of the requirements imposed on small telephone multiline systems. In the instant application, in the embodiment shown, I have disclosed and provided a detailed discussion of a hold arrangement which allows a subscriber using a multiline station to enable the hold function with respect to any line merely by operation of a single hold key.

The hold bridge is controlled by a single relay connected by its own make contact across the T and R leads of the central office line. The relay winding provides the impedance termination necessary to maintain the line active while in the hold mode. During a talking connection, the relay remains unoperated because of a direct short across its winding accomplished by a break contact of the nonoperated hold key. By arranging the hold key in conjunction with the pickup key, and by operating the hold key prior to releasing the pickup key, the short is momentarily removed from the hold relay winding thereby allowing the winding to operate from line current flowing through the network. Once the hold relay operates, it locks operated to line current directly, thereby allowing the talking network to be removed from the connection upon the release of the pickup key associated with the line.

The single contact of the hold relay is arranged to be in parallel with the telephone network both when making and breaking, and thus is always protected from line current. Also, the hold relay is strategically placed in the circuit in a manner so as to allow current to flow through the winding to maintain the line lamp lighted as well as to provide a termination for maintaining operative the connection from the central switching network to the local stations. The stations at one location are multiplied together in a unique manner so that the hold key at any station may release the hold relay by shorting across the winding. However, the arrangement is such that the hold key at each station is only effective when the station has access to the line on hold and at no other time.

A similar single relay concept is taught by A. Y. F. Lee in U.S. Pat. No. 3,733,442 dated May 15, 1973. In the Lee patent, the winding of the hold relay is arranged to be released upon being shunted by the telephone network. Under such an arrangement, critical tolerances are necessary with respect to the release currents of the relay thereby necessitating at least two additional circuit elements to insure proper operate and release margins. In my disclosed arrangement, the relay is shunted directly by an entirely metallic connection directly across the winding and thus releases immediately. The concept taught by my invention simplifies the Lee circuit considerably, thereby resulting in the elimination of circuit components required by Lee.

Accordingly, it is one feature of my invention to provide a multistation telephone system with a single element hold bridge operable from any station.

A further feature of my invention is the provision of a self-contained single relay hold bridge both operable and releaseable from any telephone station of a multiline, multistation system where the winding of the relay acts as the termination impedance to maintain the central office line in an active, noncommunicating condition.

DESCRIPTION OF THE DRAWING

The operation and utilization of the present invention will be more fully apparent from the following description of the drawing, in which.

DETAILED DESCRIPTION

Figures 1, 3:
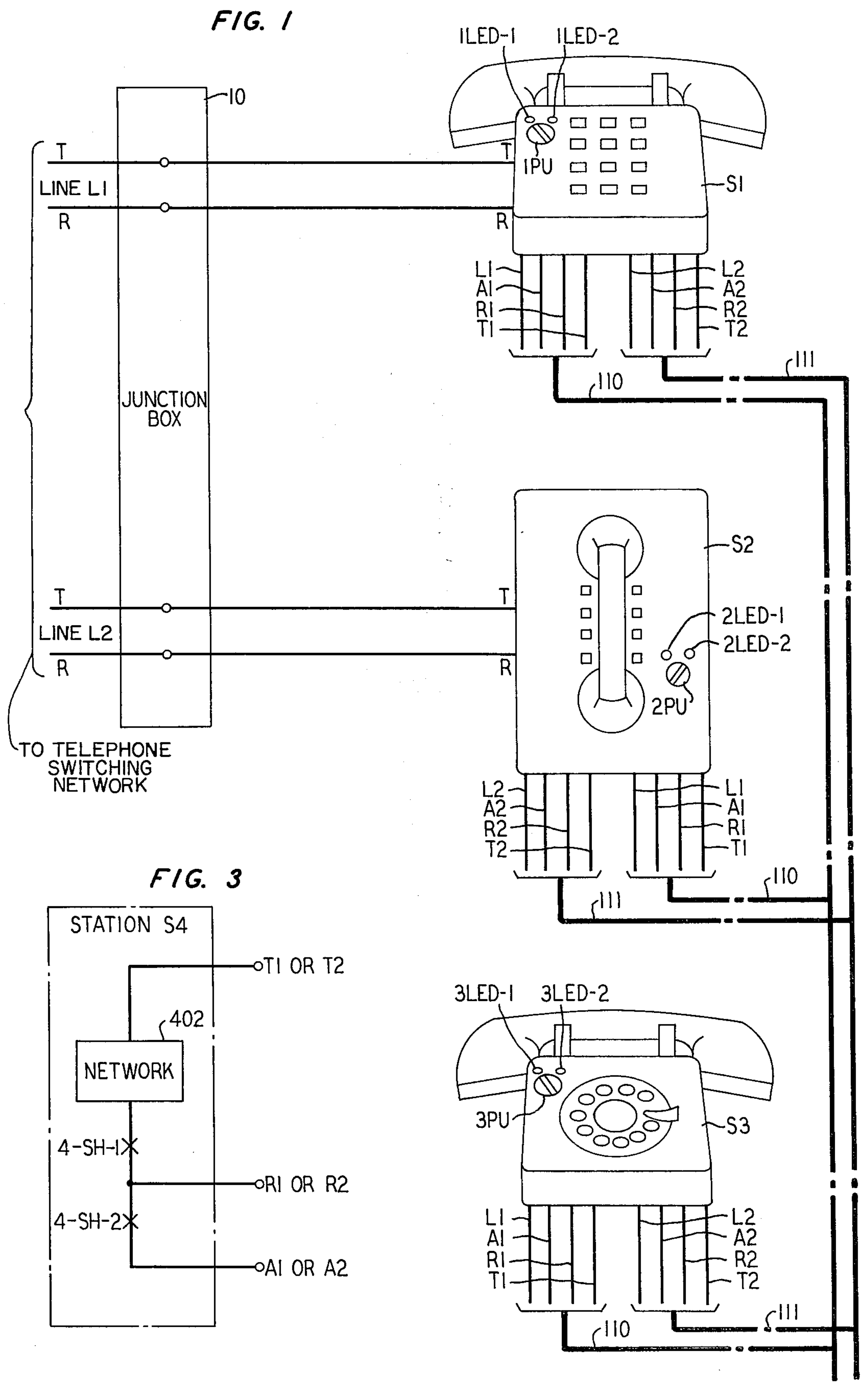
FIG. 1 shows in pictorial format three telephone stations connected to two central office lines.
FIGS. 2 and 3 are schematic drawings showing in greater detail the circuitry of the invention.

In FIG. 1 there is shown two communication pairs of lines extending directly to a central office or PBX switching network. These lines, line L1 and line L2, are extended through junction box 10 to two of the station sets shown. As shown, line L1 is extended to staion S1 while line L2 is extended to station S2 and both of these lines can be connected to any of the three stations shown by means of a selector key at each of the stations.

Supplementing the basic pair of communication leads which must be run to the stations for each line, there is a four-conductor cable which interconnects each telephone station capable of picking up that line. Thus, for example, in a two-line system there are two cables of four wires each which must interconnect all of the stations which pick up those lines. In a three-line system, in addition to the three incoming communication lead pairs, three cables of four wires each would be necessary to interconnect the stations. Also, it is important to note that the number of telephone stations is independent of the number of incoming lines serving the system and that although three such stations are shown any number of stations can be connected to the system by connecting to the respective four-conductor cable. Stations which are arranged to pick up only one line may be connected across the T and R leads of that line in the conventional manner without interfering with the operation of the visual signal system. Alternatively, such nonvisual stations may be connected between leads T1(T2) and A1(A2) to provide a visual busy signal to the lamp-equipped stations when one or more of the former are off-hook. A nonilluminated, single-line station may be arranged to provide release of hold by connecting it as shown in FIG. 3.

Each of the multiline stations is equipped with a pickup key such as pickup key 1PU associated with station S1. Each such key has as many positions as there are lines connectable to that station. Thus, since station S1 is arranged to pick up two separate incoming lines, pickup key 1PU has two positions. For convenience, this key is shown as a twist key with the leftmost position being associated with line L1 and the adjacent right position being associated with line L2. Associated with each position of the switch there is a light emitting diode mounted so as to be visible, through the face plate, to a subscriber using the telephone station. Thus, associated with position 1 of pickup key 1PU at station S1 there is shown light emitting diode 1LED-1, and associated with position 2 of pickup key 1PU there is shown light emitting diode 1LED-2.

In the situation where a call is incoming on line L1, the light emitting diode associated with line L1 on each of the station sets flashes. When the call is answered at any of the stations by turning the pickup key to position 1 and removing the handset from the switchhook, the light emitting diodes which were flashing become lighted in a visually solid or steady manner at all of the stations.

The pickup key is arranged so that by pressing inward on the key prior to turning the key, a contact called the hold contact opens and remains open as long as the key is depressed. A subscriber at any station may place an active line on hold merely by depressing or pushing in the pickup key prior to turning the key from the position associated with the currently active line to the position associated with another selected line. Alternatively, the key may be depressed and held until the handset is placed on hook. In either situation, the light emitting diode associated with the line on hold continues to provide a steady visual display. In the former situation, because of the active condition of the newly selected line, the light emitting diode associated with the selected line at each of the stations lights in a steady manner.

INCOMING CALLING CONNECTION - VISUAL DISPLAY

Figure 2:
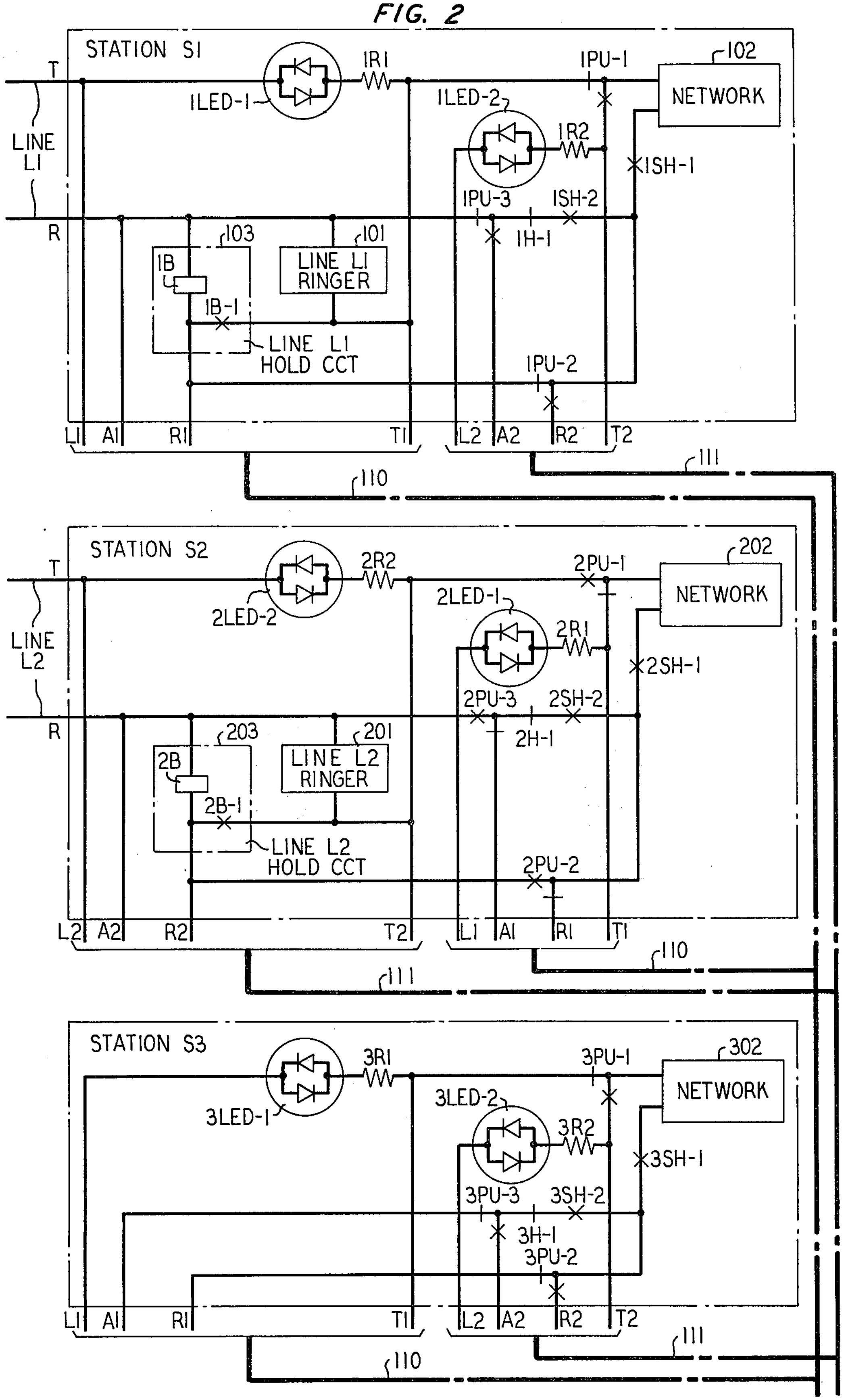

Turning now to FIG. 2, the details of the circuitry arranged to accomplish the visual control with respect to stations S1, S2 and S3 will now be discussed. Since the system, as shown, is a two-line system, the pickup key is also a two-position key. For convenience, therefore, each pickup key contact such as contact 1PU-1 of station S1 is shown as a make and break transfer pair and is adapted so that when the switch is in the line L1 position it is in the normal mode where current may pass through the break contact and not through the make contact. When the pickup key is turned to the line L2 position, the make contact of the pickcup key closes while the break contact opens. This arrangement is shown for purposes of clarity and, of course, it is recognized that a pair of make contacts, each associated with one of the line positions, could also be utilized in the same manner.

Assume now an incoming call on line L1. Accordingly, alternating or pulsating voltage potentials are provided over the T and R communication leads from the central office, which voltage causes current to flow from the T lead through bipolar light emitting diode 1LED-1 and current limiting resistor 1R1 through line L1 ringer 101 and back to the central office over the R lead of line L1, thereby operating the ringer. Since the handset (not shown but included as part of network 102) is on the switchhook, the ringing current does not pass through network 102. Of course, had the handset been off-hook, the line would have tested "busy" and, therefore, the incoming ringing current would not have been applied. Upon the application of ringing potential on line L1, light emitting diode 1LED-1 operates in a pulsating or flashing manner under control of ringing current passing through the light emitting diode and line L1 ringer 101, thereby providing a visual display at station S1 showing the active ringing condition of line L1.

At the same time, ringing potential is supplied from lead T over lead L1 of cable 110 to station S2, which ringing current passes through light emitting diode 2LED-1 and limiting resistor 2R1 and back over lead T1 of cable 110 to station S1 and through line L1 ringer 101 to the R lead of the communication pair. Thus, at station S2, light emitting diode 2LED-1 associated with line L1 also flashes. Similarly, at station S3, light emitting diode 3LED-1 associated with line L1 also flashes from current supplied over leads L1 and T1 of cable 110. Accordingly, upon the application of ringing current to line L1 the light emitting diodes associated with line L1 at each of the stations flash, indicating a ringing condition with respect to line L1 answerable from any of the stations. Also, an audible tone is provided to the subscriber only at station S1, which station should, if possible, be located at a physical location whereby audible signals generated thereat can be heard at the locations of the other stations. Alternatively, the line L1 ringer and/or additional ringer(s) may be located, either within or external to telephone sets, such that ringing can be heard by all parties.

ANSWERING OF CALLING CONDITION

Assume now that it is desired to answer the calling condition on line L1 from station S3. Accordingly, pickup key 3PU of station S3 is turned to position 1, which it will be recalled is the normal position of that key, and the handset associated with station S3 is removed from the switchhook, thereby enabling the switchhook contacts. When this occurs, network 302 becomes connected to lead T1 of cable 110 via the released break contact of pickup key contact 3PU-1. Network 302 also becomes connected to lead A1 of cable 110 via the enabled switchhook contacts 3SH-1 and 3SH-2, released hold break contact 3H-1 and released pickup key contact 3PU-3. Accordingly, network 302, which network represents the transmitting and receiving tranducers and the station dialing apparatus, all arranged in the conventional manner, is bridged across the A1 and T1 leads of cable 110, which in effect places network 302 across the T and R leads of line L1 as shown in station S1 with the parallel combination of light emitting diodes 1LED-1, 2LED-1 and 3LED-1 in series therewith. At this point, in the conventional manner, the central office ringing potential is removed and line current is provided over the T and R leads of line L1, which line current is extended over lead T through light emitting diode 1LED-1 and limiting resistor 1R1 to the T1 lead of cable 110 and through network 302 of station S3 which is bridged across leads T1 and A1 of cable 110 back through lead R of line L1. Thus, the light emitting diode 1LED-1 provides a steady visual indication. At the same time, line current is provided over lead L1 of cable 110 to station S3, which line current is extended from light emitting diode 3LED-1 and limiting resistor 3R1 to the T1 lead. Thus, the light emitting diode of station S3 associated with line L1 also lights in a steady manner. Since at station S2 the light emitting diode 2LED-1 is also in parallel across the T1 and L1 leads of cable 110, that diode also lights in a steady manner. Accordingly, in response to the selection of line L1 from station S3, the light emitting diodes of all three stations associated with line L1 provide a steady visual signal of the off-hook condition of line L1.

ESTABLISHING A HOLD CONDITION

For purposes of discussion, let us not assume that the subscriber at station S1 is communicating on line L1 and, further, let us assume that no other subscriber station is concurrently connected to line L1. Under this situation, when the subscriber at station S1 desires to place line L1 on hold, the pickup key is depressed and turned to the line L2 position or, alternatively, the hold key is depressed and the subscriber places the handset on the switchhook. In either situation, line L1 goes into the hold mode where the winding of the 1B relay becomes an alternate termination for the established communication connection on line L1.

The manner in which the hold function is enabled is as follows. Line current from lead T, which flows through light emitting diode 1LED-1, limiting resistor 1R1, released pickup key break contact 1PU-1, network 102, enabled switchhook contacts 1SH-1 and 1SH-2, released hold key break contact 1H-1 and released pickup key break contact 1PU-3 to the R lead of line L1, stops flowing over this path when the hold key is depressed. This results from the operation of hold break contact 1H-1. Thus, since the hold contact opens prior to the time when the pickup contact is changed and prior to the time when the switchhook contact is open, line current continues to flow from the T lead, through network 102 and enabled switchhook contact 1SH-1 and via released pickup key contact 1PU-2 through the windinng of hold relay 1B to lead R, thereby operating hold relay 1B. In effect then, the short, which consists of a path from lead R1 through contacts 1PU-2, 1SH-2, 1H-1 and 1PU-3 to lead A1, is removed from across the winding of relay 1B. When relay 1B operates, a path is completed from one side of the winding of relay 1B through enabled make contact 1B-1 to the T lead through limiting resistor 1R1 and light emitting diode 1LED-1. Thus, hold relay 1B locks operated to line current. Accordingly, when the pickup key contacts 1PU-1 and 1PU-2 subsequently open removing network 102, or when switchhook contact 1SH-1 opens removing network 102, hold relay 1B remains operated across the T and R leads via its own make contact 1B-1.

It is important to note that if the switchhook contact 1SH-1 opens or if the switchhook contacts open prior to the enabling of hold relay 1B, which is the situation when the station goes on-hook or another line is selected prior to the operation of the hold key, relay 1B could not operate since the operate path for the hold relay, which path includes contacts 1SH-1 and 1PU-1, is open. It should also be pointed out that when the hold relay 1B operates line current flows through light emitting diode 1LED-1 as well as through the hold relay, thereby providing a continuous visual indication as an indication of the enabled hold status of line L1.

It should be noted that depressing the hold key without returning the handset to the switchhook causes relay 1B to operate, closing contact 1B-1 which places a direct short across network 102 via make contacts 1B-1, 1PU-2, 1SH-1 and 1PU-1. This short across network 102 disables the talking circuitry of station S1, allowing local conversation which cannot be heard by the other party over line L1. Thus, a privacy feature is provided during a temporary depression of the hold key without hanging up or selecting another line.

RETURN FROM HOLD MODE

Assume now that the subscriber at station S3 desires to communicate over line L1 while line L1 is in the hold mode. In this situation the subscriber at station S3 turns the pickup key thereat to the line L1 position and removes the handset from the switchhook. Accordingly, network 302 becomes bridged across the L1 and A1 leads of cable 110 via released pickup key contact 3PU-1 and enabled switchhook contact 3SH-1, released hold key contact 3H-1 and enabled pickup key contact 3PU-3. Also note that, with respect to station S3, lead A1 is connected directly to lead R1 of cable 110 via released pickup key contact 3PU-1, released hold key contact 3H-1, enabled switchhook contact 3SH-2 and released pickup key contact 3PU-2. This direct short across the A1 and R1 leads of cable 110 is communicated to station S1 via cable 110, thereby forcing hold relay 1B to release and thereby allowing communication to take place between network 302 of station S3 and leads T and R of line L1. When hold relay 1B operates or releases, a network such as network 102 is across the contact 1B-1, thereby protecting that contact from excessive current surges. This is an important consideration if contact life is to be preserved.

The line hold relay for line L2 is shown mounted in station S2 and is operable from any station S1 through S3 in the manner just described for the hold bridge relay associated with line L1. Thus, any station connected to the system having access to any line also has the capability of controlling the hold mode in a positive manner by shorting or removing the short from the associated hold relay winding merely by pressing inward on the pickup key prior to selecting another central office line or prior to returning the handset to the switchhook.

CONCLUSION

While in the embodiment discussed a three-station two-line system is shown, the invention is not confined to use in such a system but can be used with a single station serving one line or many lines, or with a multiple station system serving single or multiple lines, all without departing from the spirit and scope of my invention.

Furthermore, although the means of activating the hold function has been discussed above as integrated with the line select function by use of a button which is depressed for hold and turned for line selection, other button or key arrangements may be used without departing from the spirit or scope of my invention. For example, a standard key telephone set with separate hold and pickup buttons may be readily wired to operate with a system such as the one represented in FIG. 2. In such instance, the incandescent lamps normally used with such sets would be advantageously replaced by LED/resistor combination, such as 1LED-1/1R1 shown in FIG. 2. With such arrangement, however, the privacy feature is not achieved because of the mechanical arrangement of the buttons on such telephone sets.

Of course, it will be obvious that sine the hold relay is held operated by line current from the central office the hold relay will release when current stops flowing.

What is claimed is:

1. A subscriber telephone station comprising:

at least one pair of communication leads for connecting said subscriber station to a telephone switching network, an impedance network connectable to any said pair of communication leads for maintaining any communication connection directed to said subscriber station over said communication leads in an active communicating condition;

alternate means independent of any source of power other than said communication leads for maintaining in an active noncommunicating condition any such communication connection directed to said subscriber station, said alternate means comprising:

a relay having a single operate winding and a contact connected in series with said relay winding, said contact operable upon the enabling of said relay for connecting said relay winding across said communication leads so as to provide a proper impedance for maintaining in an active noncommunicating condition any communication connection directed to said subscriber station, said relay connected across said pair of communication leads over a first path, said relay connected across said pair of communication leads through a make contact of said relay over a second path, said relay operable directly from line current flowing between said communication leads in said first and said second paths, direct shorting means connected across said relay winding in parallel with said first relay operate path for preventing the operation of said relay, and a hold key associated with each said subscriber station having a contact operable upon the momentary enabling of said hold key for removing said direct shorting means from said relay winding thereby allowing said relay to operate over said first path and remain operated over said second path from line current flowing in said communication leads of said established communication connection so as to establish an active noncommunication condition with respect to said communication leads.

2. The invention set forth in claim 1 wherein said station has a swtichhook contact for controlling said communication connection to said impedance network and a pickup key contact operagle for controlling said communication connection to said impedance network; and wherein said direct shorting means includes a break contact of said hold key, and at least one said switchhook contact, at least one said pickup key contact; and wherein said first path includes at least one pickup key contact and at least one switchhook contact and said impedance network.

3. The invention set forth in claim 1 wherein said direct shorting means is a continuous metallic connection exclusive of a connection through said impedance network.

4. The invention set forth in claim 1 further comprising a second subscriber telephone station having a second impedance network connectable to said pair of communication leads for establishing a communication connection between said second station and said telephone switching network, second direct shorting means connected across said relay winding in parallel with said first relay operate path, a third path for connecting said relay across said communication leads, and a hold key associated with said second subscriber station having a contact operable upon the momentary enabling of said hold key for removing said second direct shorting means from said relay winding thereby allowing said relay to operate over said third path and to remain operated over said second path so as to establish an active noncommunication condition with respect to said communication leads.

5. The invention set forth in claim 4 wherein said second subscriber telephone station has a switchhook contact for controlling said communication connection to said second impedance network and a pickup key contact operable for controlling said communication connection to said second impedance network; and wherein said second direct shorting means includes a break contact of said hold key, and at least one said switchhook contact, at least one said pickup key contact; and wherein said third path includes at least one pickup key contact and at least one switchhook contact and said second impedance network.

6. The invention set forth in claim 1 wherein said relay contact is further operable upon the enabling of said relay for establishing a direct short across said impedance network so as to render said impednace network inoperative for the communication of intelligible information thereby providing privacy for a subscriber using said station.

7. A hold circuit for use in a telephone switching system wherein communication connections are established directly from a telephone switching network over a pair of communication leads to a subscriber station, said hold circuit independent of any source of power other than said communication leads, said hold circuit comprising:

a transducing network connectable across said communication leads and operable for communicating intelligible information to and from said subscriber station over said communication leads, said transducing network being activated from direct current present on said pair of communication leads from said telephone switching network;

a relay having a winding connected across said pair of communication leads and operable to provide a noncommunicating termination for said pair of communication leads so as to maintain said direct current which is present on said pair of communication leads from said telephone switching network;

a key at said subscriber station operable to directly enable said relay;

means including a contact of said relay operable for maintaining said relay operated from said direct current present on said pair of communication leads;

means, including a contact of said key and including said contact means, for establishing a metallic connection across the winding of said relay so as to maintain said relay in an unoperated condition when said contact means is enabled and said direct current is present on said communication leads when said key is unoperated; and means including said contact means and said transducing network for operating said relay only when said key is operated prior to the release of said contact means.

8. The invention set forth in claim 7 whereby said metallic connection is reestablished across said relay winding so as to release said relay upon the subsequent operation of said contact means.

9. The invention set forth in claim 7 wherein said relay contact is further operable upon the enabling of said relay for establishing a direct short across said transducing network so as to render said transducing network inoperative for the communication of intelligible information when said key is operated and said contact means is operated thereby providing privacy for a subscriber using said station.

* * * * *

UNITED STATES PATENT OFFICE

CERTIFICATE OF CORRECTION

PATENT NO. : 3,916,116

DATED : October 28, 1975

INVENTOR(S) : James R. McEowen

It is certified that error appears in the above-identified patent and that said Letters Patent are hereby corrected as shown below:

Column 3, line 29, "staion" should read --station--. Column 4, line 46, "pickcup" should read --pickup--. Column 6, line 6, "not" should read --now--. Column 6, line 33, "windinng" should read --winding--. Column 7, line 64, "sine" should read --since--. Column 8, line 50, "operagle" should read --operable--. Column 9, line 30, "impednace" should read --impedance--.

Signed and Sealed this

*second* Day of *March 1976*

[SEAL]

*Attest:*

RUTH C. MASON
*Attesting Officer*

C. MARSHALL DANN
*Commissioner of Patents and Trademarks*